UNITED STATES PATENT OFFICE.

CONSTANT LAVAL, OF NEW YORK, N. Y.

PROCESS OF SILVERING GLASS.

SPECIFICATION forming part of Letters Patent No. 242,337, dated May 31, 1881.

Application filed October 22, 1880. (No specimens.)

*To all whom it may concern:*

Be it known that I, CONSTANT LAVAL, a citizen of the United States, residing at the city, county, and State of New York, have invented new and useful Improvements in the Process of Silvering Glass, of which the following is a specification.

This invention relates to an improved process for depositing silver upon glass from solutions comprising silver, salts, ammonia, gun-cotton, and caustic alkali, and is especially suitable for the manufacture of mirrors.

Heretofore the deposition of a silver coating upon glass has been effected by mixing together a solution containing ammonio-nitrate of silver and another containing a caustic alkali and gun-cotton, floating the mixture upon the glass and allowing precipitation of the silver to take place; but the proportions of the ingredients of these solutions are not such as I use, and I lay no claim to such a process broadly.

In carrying out my invention I prepare the materials to be used as follows: I first take twenty grams of nitrate of silver and dissolve it in one hundred and eighty cubic centimeters of water, and to this solution I add three grams of aqua-ammonia, forming an ammonio-nitrate of silver. The compound is then allowed to settle for one or two hours, when it is ready for use, and constitutes solution No. 1.

Next I dissolve two hundred and forty grams nitrate of silver in ninety cubic centimeters of water, and to this solution I add ten grams of potassa dissolved in four hundred and eighty cubic centimeters of water. To this mixture I add fifteen grams of gun-cotton or pyroxyline, stir the whole well together, and filter it, when it forms solution No. 2.

When, now, I desire to deposit a reflecting-surface upon a mirror-glass I preferably clean and lay said glass flat, and, after adding to a suitable quantity of water equal parts of solutions Nos. 1 and 2, pour the mixture thus formed upon the glass, it being prevented from running off the glass by the usual or any suitable means. The deposition of silver immediately commences, and is allowed to continue, say about fifteen minutes, when the glass will be covered with a brilliant reflecting coating of silver having the qualities as hereinbefore set forth. In order to increase the stability of the coating I prefer to make a second deposit upon the first, which is done by simply repeating the operation, as described.

In mixing the two solutions Nos. 1 and 2 with water, preparatory to applying the complete compound to the glass, I use the following approximate proportions: water, four hundred and eighty cubic centimeters; solution No. 1, fifteen cubic centimeters; solution No. 2, fifteen cubic centimeters. This will give a deposit of moderate hardness suitable for most purposes.

After the depositing upon the glass has been completed I generally cover the back of the deposit with a heavy coat of paint.

The degree of hardness of the deposit may be modified by varying the proportions of the different ingredients of the solutions, and, therefore, I do not limit myself to the precise proportions above given. For instance, the following proportions of the respective solutions will be suitable for a very hard deposit: water, four hundred and eighty cubic centimeters; solution No. 1, thirty cubic centimeters; solution No. 2, thirty cubic centimeters.

Though I have described my process as especially applicable to silvering mirrors, I do not confine myself to its application for that purpose, as it may be used for other purposes—as, for instance, the ornamentation of glass.

I do not claim, broadly, the precipitation of silver from solutions by means of pyroxyline, gun-cotton, or collodion.

I claim and desire to secure by Letters Patent—

The process of silvering glass, consisting in mixing immediately before application two solutions, one of which is composed of nitrate of silver, water, and aqua-ammonia, in the approximate proportions specified, and the other of nitrate of silver, water, potassa, and gun-cotton or pyroxyline in the approximate proportions specified, the completed mixture being floated upon the glass and allowed to remain until the silver deposit is effected, essentially as set forth.

In testimony whereof I have hereunto set my hand in the presence of two subscribing witnesses.

CONSTANT LAVAL.

Witnesses:
THOMAS BRUMAN,
M. H. TOPPING.